United States Patent
Lin et al.

(10) Patent No.: US 12,267,818 B2
(45) Date of Patent: Apr. 1, 2025

(54) INFORMATION SENDING METHOD AND APPARATUS, AND INFORMATION RECEIVING APPARATUS

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 374 days.

(21) Appl. No.: 17/738,458

(22) Filed: May 6, 2022

(65) Prior Publication Data

US 2022/0264568 A1 Aug. 18, 2022

Related U.S. Application Data

(63) Continuation of application No. PCT/CN2019/116409, filed on Nov. 7, 2019.

(51) Int. Cl.
*H04W 4/00* (2018.01)
*H04W 72/0446* (2023.01)
*H04W 72/20* (2023.01)

(52) U.S. Cl.
CPC ....... *H04W 72/0446* (2013.01); *H04W 72/20* (2023.01)

(58) Field of Classification Search
CPC .......................... H04W 72/04; H04W 72/0446
See application file for complete search history.

(56) References Cited

U.S. PATENT DOCUMENTS 11,184,907 B2 * 11/2021 Bagheri ................ H04L 1/1822
2013/0301503 A1    11/2013 Park
(Continued)

FOREIGN PATENT DOCUMENTS

CN        103378951 A       10/2013
CN        107919948 A       4/2018
(Continued)

OTHER PUBLICATIONS

WILUS Inc. On Shorter SPS PDSCH Periodicity for NR URLLC, R1-1907388, 3GPP TSG RAN WG1 #97, Reno, USA, May 13-17, 2019.
(Continued)

*Primary Examiner* — Elisabeth Benoit Magloire
(74) *Attorney, Agent, or Firm* — Ladas & Parry LLP

(57) ABSTRACT

The present application discloses an information sending method and receiving method, an apparatus, a device, and a storage medium. The method comprises: receiving, by a terminal, a first downlink channel; determining, by the terminal, a first time domain unit according to a time domain unit occupied by the first downlink channel and time offset information; determining, by the terminal, a second time domain unit, where the second time domain unit is after the first time domain unit; and transmitting, by the terminal, feedback information corresponding to the first downlink channel on the second time domain unit. An embodiment of the present application provides a new means of sending feedback information, such that when there is no one-to-one configuration between downlink channel and uplink channel resources, it is still possible to ensure that feedback information can be accurately transmitted between a terminal and a base station.

17 Claims, 5 Drawing Sheets

(56) References Cited

U.S. PATENT DOCUMENTS

| | | | | |
|---|---|---|---|---|
| 2015/0131579 A1* | 5/2015 | Li | ................... | H04L 1/1858 370/329 |
| 2019/0166621 A1* | 5/2019 | Yerramalli | ............ | H04L 5/0082 |
| 2019/0356455 A1* | 11/2019 | Yang | ............... | H04L 1/1861 |
| 2020/0366339 A1* | 11/2020 | Gao | ............... | H04B 7/0404 |

FOREIGN PATENT DOCUMENTS

| | | | |
|---|---|---|---|
| CN | 108401270 A | | 8/2018 |
| CN | 109586877 A | | 4/2019 |
| CN | 110149173 A | | 8/2019 |
| CN | 110166214 A | | 8/2019 |
| CN | 110324117 A | | 10/2019 |
| WO | 2018127230 A1 | | 7/2018 |
| WO | 2018145583 A1 | | 8/2018 |
| WO | 2019028857 A1 | | 2/2019 |

OTHER PUBLICATIONS

The first Office Action of corresponding Chinese application No. 202210238449.6, dated Apr. 11, 2023.
The second Office Action of corresponding Chinese application No. 202210238449.6, dated Jun. 14, 2023.
The second Office Action of corresponding European application No. 19951855.6, dated Aug. 28, 2023.
The third Office Action of corresponding Chinese application No. 202210238449.6, dated Aug. 9, 2023.
Qualcomm Incorporated,Remaining Design Details for URLLC Downlink SPS,R1-1911124,3GPP TSG-RAN WG1 #98b,Chongqing, China,Oct. 14-20, 2019.
WILUS Inc, On SPS PDSCH for Nr URLLC,R1-1911320,3GPP TSG RAN WG1 #98bis,Chongqing,China, Oct. 14-20, 2019.
The EESR of corresponding European application No. 19951865. 6,dated on Sep. 14, 2022.
The first Office Action of corresponding Indian application No. 202217032150 , dated Nov. 10, 2022.
International Search Report (ISR) dated Jul. 29, 2020 for Application No. PCT/CN2019/116409.
LG Electronics. 3GPP TSG RAN WG1 #98 R1-1909493; Summary of 7.2.6.7 Others, Prague, Czech Republic, Aug. 26-30, 2019.
OPPO. 3GPP TSG RAN WG1#98 R1-1909645; Offline summary on UCI enhancements for URLLC, Prague, CZ, Aug. 26-30, 2019.
Mediatek Inc. "Evaluation and enhancements of NR PUCCH", R1-1812375, Nov. 3, 2018(Nov. 3, 2018).
The Notice of Allowance of corresponding Chinese application No. 202210238449.6, dated Dec. 22, 2023.
The first Office Action of corresponding European application No. 19951855.6, dated Mar. 13, 2023.
Hearing Notice of corresponding India application No. 2202217032150, dated Nov. 6, 2024.
The first office action of corresponding KR application No. 10-2022-7018651, dated Feb. 14, 2025.

* cited by examiner

INFORMATION SENDING METHOD AND APPARATUS, AND INFORMATION RECEIVING APPARATUS

CROSS-REFERENCE TO RELATED APPLICATIONS

This application is a continuation of International Application No. PCT/CN2019/116409, filed on Nov. 7, 2019, which is hereby incorporated by reference in its entirety.

TECHNICAL FIELD

The present application relates to the field of communication technology and, in particular, to an information sending method and receiving method, an apparatus, a device, and a storage medium.

BACKGROUND

In a 5G NR (New Radio) system, URLLC (Ultra-reliable Low Latency Communication) is introduced.

The URLLC is characterized by achieving ultra-high reliability transmission within a very short delay, such as, achieving 99.999% transmission reliability within 1 millisecond. In Rel-15 (Release 15), the terminal is configured with at most one set of SPS (Semi-persistent Scheduling) transmission parameters, with a shortest SPS period of 10 ms. The SPS transmission parameters configured by a base station through a high-level signaling mainly include: period, time domain resources, PUCCH (Physical Uplink Control Channel) resources for transmitting ACK (Acknowledgement)/NACK (Negative Acknowledgement), etc. Since a minimum SPS transmission period is 10 ms, and a longest uplink-downlink data switching period supported by the Rel-15 is 10 ms, that is, at least one certain uplink transmission resource is included in a 10 ms period. Therefore, the PDSCH (Physical Downlink Shared Channel) of the SPS adopts independent feedback, that is, one SPS PDSCH (Semi-persistent Scheduling Physical Downlink Shared Channel) corresponds to one PUCCH carrying its ACK/NACK information.

In Rel-16 (Release 16), in order to better support URLLC transmission, the SPS period will be shortened, for example, it can be as short as 2 symbols. After the SPS period is shortened, according to an existing configuration method of one SPS PDSCH corresponding to one PUCCH resource, some SPS PDSCHs will not have available PUCCH resources, that is, one-to-one configuration cannot be implemented between SPS PDSCH and PUCCH.

SUMMARY

Embodiments of the present application provide an information sending method and receiving method, an apparatus, a device, and a storage medium. The technical solution is as follows.

In one aspect, an embodiment of the present application provides an information sending method, and the method includes:

receiving, by a terminal, a first downlink channel;

determining, by the terminal, a first time domain unit according to a time domain unit occupied by the first downlink channel and time offset information;

determining, by the terminal, a second time domain unit, where the second time domain unit is after the first time domain unit; and transmitting, by the terminal, feedback information corresponding to the first downlink channel on the second time domain unit.

On the other hand, an embodiment of the present application provides an information receiving method, and the method includes:

sending, by a base station, a first downlink channel; and receiving, by the base station, feedback information corresponding to the first downlink channel transmitted on a second time domain unit;

where the second time domain unit is a time domain unit after a first time domain unit, and the first time domain unit is determined according to a time domain unit occupied by the first downlink channel and time offset information.

In yet another aspect, an embodiment of the present application provides an information sending apparatus, applied to a terminal, where the apparatus includes:

an information receiving module, configured to receive a first downlink channel;

a first determining module, configured to determine a first time domain unit according to a time domain unit occupied by the first downlink channel and time offset information;

a second determining module, configured to determine a second time domain unit, where the second time domain unit is after the first time domain unit; and an information sending module, configured to transmit feedback information corresponding to the first downlink channel on the second time domain unit.

In yet another aspect, an embodiment of the present application provides an information receiving apparatus, applied to a base station, where the apparatus includes:

an information sending module, configured to send a first downlink channel; and an information receiving module, configured to receive feedback information corresponding to the first downlink channel transmitted on a second time domain unit;

where the second time domain unit is a time domain unit after a first time domain unit, and the first time domain unit is determined according to a time domain unit occupied by the first downlink channel and time offset information.

In still another aspect, an embodiment of the present application provides a terminal, where the terminal includes a processor and a memory, the memory stores a computer program, and the computer program is used to be executed by the processor to implement the above information sending method.

In still another aspect, an embodiment of the present application provides a base station, where the base station includes a processor and a memory, the memory stores a computer program, and the computer program is used to be executed by the processor to implement the above information receiving method.

In yet still another aspect, an embodiment of the present application provides a computer-readable storage medium, the storage medium having a computer program stored thereon, and the computer program is loaded and executed by a processor to implement the above information sending method.

In yet still another aspect, an embodiment of the present application provides a computer-readable storage medium, the storage medium having a computer program stored thereon, and the computer program is loaded and executed by a processor to implement the above information receiving method.

In yet still another aspect, the present application provides a computer program product which, when running on a terminal, causes the terminal to execute the above information sending method.

In yet still another aspect, the present application provides a computer program product which, when running on a terminal, causes the base station to execute the above information receiving method.

Technical solutions provided by embodiments of the present application can bring the following beneficial effects:

through determining a first time domain unit according to a time domain unit occupied by a first downlink channel and time offset information, then determining one second time domain unit for transmitting feedback information corresponding to the first downlink channel after the first time domain unit, and transmitting the feedback information corresponding to the first downlink channel on the second time domain unit, a new means of sending feedback information is provided, such that when there is no such a condition for one-to-one configuration of downlink channel and uplink channel resources, it is still possible to ensure that feedback information can be accurately transmitted between a terminal and a base station, helping to improve robustness of communication.

BRIEF DESCRIPTION OF DRAWINGS

In order to more clearly illustrate the technical solutions in the embodiments of the present application, the following will briefly describe the drawings needed to be used in the description of the embodiments. It is obvious that the drawings described below are only some embodiments of the present application, and for those of ordinary skill in the art, without creative effort, other drawings can also be obtained according to these drawings.

DESCRIPTION OF EMBODIMENTS

In order to make the purpose, technical solutions, and advantages of the present application clearer, implementations of the present application will be described in further detail below in conjunction with the drawings.

A network architecture and business scenarios described in embodiments of the present application are intended to more clearly illustrate the technical solutions of the embodiments of the present application, and do not constitute a limitation on the technical solutions provided in the embodiments of the present application. It is known to those of ordinary skill in the art that with the evolution of network architectures and the emergence of new business scenarios, the technical solutions provided by the embodiments of the present application are equally applicable to similar technical problems.

Figure 1:
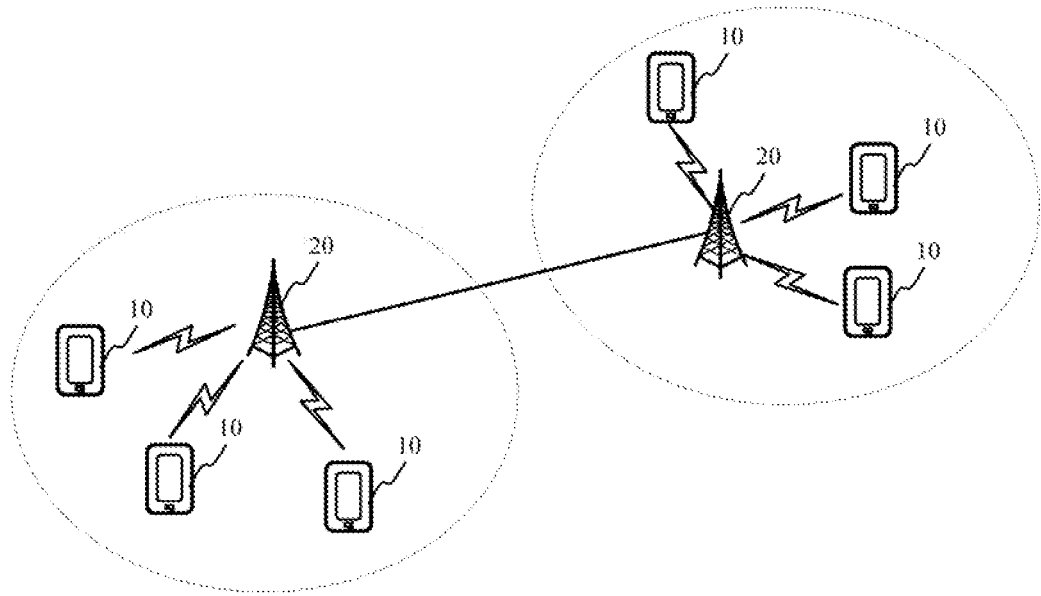
FIG. 1 is a schematic diagram of a network architecture provided by an embodiment of the present application.

Please refer to FIG. 1, which shows a schematic diagram of a network architecture provided by an embodiment of the present application. The network architecture can include: terminals 10 and a base station 20.

The number of terminals 10 is usually multiple, and one or more terminals 10 may be distributed in a cell managed by each base station 20. Terminals 10 may include various handheld devices with wireless communication functions, vehicle-mounted devices, wearable devices, computing devices, or other processing devices connected to wireless modems, as well as various forms of user equipment (UE), mobile stations (MS), terminal devices, etc. For convenience of description, the above-mentioned devices are collectively referred to as terminals in the embodiments of the present application.

The base station 20 is an apparatus deployed in an access network to provide wireless communication functions for terminal 10. The base station 20 may include various forms of macro base stations, micro base stations, relay stations, access points, etc. In systems using different wireless access technologies, names of devices with base station functions may be different, for example, in 5G NR systems, they are called gNodeB or gNB. With the evolution of communication technology, the name "base station" may change. For convenience of description, in the embodiments of the present application, the above-mentioned apparatuses for providing wireless communication functions for terminal 10 are collectively referred to as base stations.

The "5G NR system" in the embodiments of the present disclosure may also be referred to as a 5G system or an NR system, but those skilled in the art can understand its meaning. The technical solutions described in the embodiments of the present disclosure may apply to the 5G NR system, and may also apply to a subsequent evolution system of the 5G NR system.

In the NR system, a length of a frame (radio frame) is defined as 10 milliseconds, and each frame includes 10 subframes, numbered 0-9 respectively. Where 5 subframes form one half frame: the subframes numbered (0-4 form one half frame, and the subframes numbered 5-9 form another half frame.

The basic frame structure of the NR system is in terms of a slot (slot). Under a conventional CP (Cyclic Prefix) configuration, each slot contains 14 symbols. In the case of extended CP, each slot contains 12 symbols. The symbols in each slot can be divided into three categories: downlink symbols, uplink symbols and flexible symbols. According to actual scheduling of the base station, a flexible symbol can be used to transmit downlink data or uplink data, that is, a transmission direction of the symbol is not fixed.

Frame structure configuration of the NR system adopts a combination of RRC (Radio Resource Control) semi-static configuration and DCI (Downlink Control Information) dynamic configuration for flexible configuration. The RRC signaling semi-static configuration supports both cell-specific RRC configuration and UE (user equipment) specific RRC configuration. The DCI dynamic configuration method supports both a direct indication by SFI (Slot Format Indication) and DCI scheduling determination.

For the frame structure of the RRC signaling semi-static configuration, the NR system configures the frame structure based on a period, with only one transition point from downlink transmission to uplink transmission in each period, thereby ensuring continuous downlink resources and continuous uplink resources in each period. The period of the frame structure in Rel-15 (Release 15) may be 0.5 milliseconds, 0.625 milliseconds, 1 millisecond, 1.25 milliseconds, 2 milliseconds, 2.5 milliseconds, 5 milliseconds, and 10 milliseconds.

For the frame structure of dynamic DCI configuration, it can be implemented by DCI format 2_0 indicating SFI, or by DCI format 0_0/0_1/1_0/1_1 scheduling uplink data transmission or downlink data transmission. The frame structure is not changed by the way of scheduling data, but the DCI scheduling uplink or downlink data transmission implicitly gives a transmission direction of the scheduled symbol.

In the NR system, the data transmission method includes two types: dynamic transmission and semi-continuous/semi-static transmission. The characteristic of dynamic transmission is that the parameters of each data transmission are indicated by the corresponding DCI. In an implementation, the DCI includes information such as physical resources used by the PDSCH and HARQ (Hybrid Automatic Repeat Request) process number, etc. Semi-continuous/semi-static transmission is characterized in that the transmission resources and transmission methods are both semi-continuous/semi-static configured. DCI is used to activate/release the corresponding SPS (Semi-persistent Scheduling) transmission, and once activated, subsequent transmissions do not require a physical layer signaling, for example, not requiring a DCI signaling.

Figure 2:
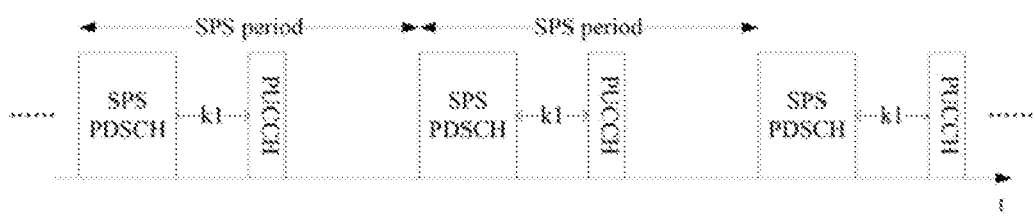
FIG. 2 schematically illustrates a schematic diagram of a time domain positional relationship between PDSCH and PUCCH.

In Rel-15, the terminal is configured with at most one set of SPS transmission parameters, with a shortest SPS period is 10 ms. The SPS transmission parameters configured by the base station through a high-level signaling mainly include: period, time domain resources, PUCCH resources for transmitting ACK (Acknowledgement)/NACK (Negative Acknowledgement), etc. Since a minimum SPS transmission period is 10 ms, and a longest uplink-downlink data switching period supported by the Rel-15 is 10 ms, that is, at least one certain uplink transmission resource is included in a 10 ms period. Therefore, the PDSCH of the SPS adopts independent feedback, that is, one SPS PDSCH corresponds to one PUCCH carrying its ACK/NACK information. The PUCCH configured by the base station for the SPS PDSCH to transmit ACK/NACK is PUCCH format 0 or format 1, where format 0 or format 1 can only carry at most 2 bits of ACK/NACK information. Then, the base station performs SPS activation or deactivation through DCI, and the activation signaling will further indicate some SPS transmission parameters, including: frequency domain resources, feedback timing, etc. As shown in FIG. 2, the activation signaling is sent only once, and once the SPS transmission is activated, under the same time resource, that is, without dynamic scheduling in one SPS period, the base station will always send an SPS PDSCH and the terminal will always send ACK/NACK information corresponding to the SPS PDSCH. And there is a time interval k1 between the base station sending the SPS PDSCH and the terminal sending the ACK/NACK, and the time interval k1 is the feedback timing.

Figure 3:
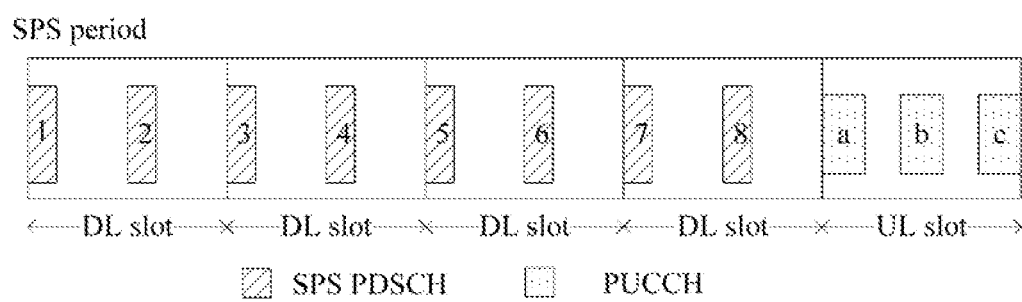
FIG. 3 schematically illustrates a schematic diagram of another time domain positional relationship between PDSCH and PUCCH.

URLLC (Ultra-reliable Low Latency Communication) is introduced in the NR system, which is characterized by achieving ultra-high reliability transmission within extreme latency, such as achieving 99.999% transmission reliability within 1 millisecond. In Rel-16 (Release 16), in order to better support URLLC transmission, the SPS period will be shortened, and the shortest period can be 2 symbols. After the SPS period is shortened, according to an existing configuration method of one SPS PDSCH resource corresponding to one PUCCH resource, some SPS PDSCHs will not have available PUCCH resources. As shown in FIG. 3, a time interval from different SPS PDSCHs to uplink resources is different, and according to the existing way of configuring one feedback timing to apply to all SPS PDSCHs, there will be a large number of SPS PDSCHs without corresponding to PUCCHs, that is, a one-to-one configuration cannot be implemented between SPS PDSCHs and PUCCHs.

In the following, the technical solution of the present application will be introduced and explained in combination with several exemplary embodiments.

Figure 4:
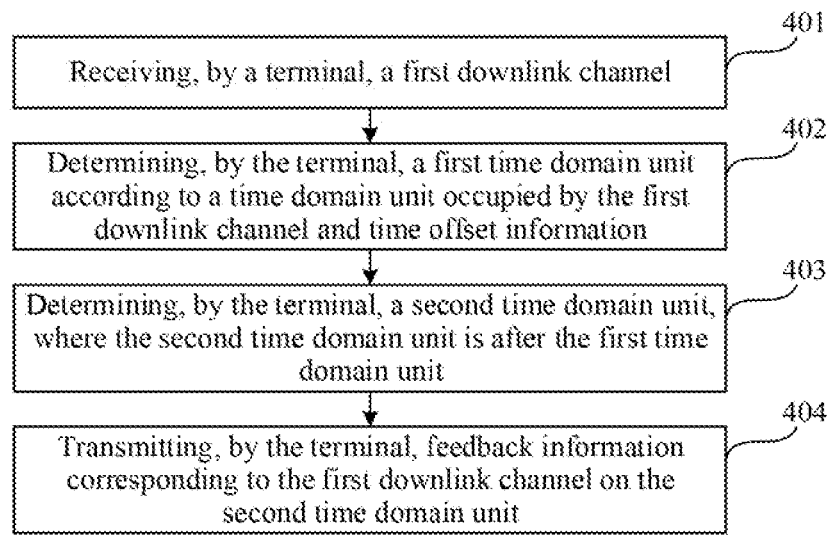
FIG. 4 is a flowchart of an information sending method provided by an embodiment of the present application.

Please refer to FIG. 4, which shows a flowchart of an information sending method provided by an embodiment of the present application. The method can be applied to the terminal of the network architecture shown in FIG. 1, and the method can include the following steps.

401: receiving, by a terminal, a first downlink channel.

In an embodiment of the present application, the receiving, by the terminal, the first downlink channel means that the terminal receives data and/or signaling carried on the first downlink channel. In an implementation, the first downlink channel is PDSCH or PDCCH (Physical Downlink Control Channel). Exemplarily, when the first downlink channel is the PDSCH, the receiving, by the terminal, the first downlink channel means that the terminal receives downlink data carried on the PDSCH.

402: determining, by the terminal, a first time domain unit according to a time domain unit occupied by the first downlink channel and time offset information.

In an implementation, in an embodiment of the present application, the time domain unit may be a slot, a subframe, or a subslot. The time offset information is used to indicate a minimum interval duration between the time domain unit occupied by the first downlink channel and a time domain unit occupied by feedback information corresponding to the first downlink channel. In an implementation, after receiving the first downlink channel, the terminal performs processing such as analyzing the first downlink channel, and generating feedback information, and the time offset information corresponds to a duration greater than or equal to a duration of the terminal performs processing on the first downlink channel. The terminal can determine the first time domain unit according to the time domain unit occupied by the first downlink channel and the time offset information, for example, the terminal adds an end position of the time domain unit occupied by the first downlink channel to the above minimum interval duration, to determine a starting position of the first time domain unit. Where the feedback information refers to information generated by the terminal after performing processing such as analyzing the first downlink channel, and the information is used for indicating whether the first downlink channel is successfully received. In an implementation, the feedback information includes ACK and NACK.

403: determining, by the terminal, a second time domain unit, where the second time domain unit is after the first time domain unit.

The second time domain unit is a time domain unit after the first time domain unit. In the embodiment of the present application, after the terminal determines the first time domain unit, a time domain unit satisfying a constraint condition is selected after the first time domain unit as the second time domain unit for transmitting the feedback information corresponding to the first downlink channel.

In a possible implementation, the above second time domain unit is a time domain unit firstly satisfying the constraint condition after the first time domain unit. After the first time domain unit, there may be multiple time domain units satisfying the constraint condition. In the embodiment of the present application, after the terminal determines the time domain unit firstly satisfying the constraint condition, this time domain unit is used as the second time domain unit. The time domain unit firstly satisfying the constraint condition may be the time domain unit that has the minimum interval duration with the first time domain unit and satisfies the constraint condition.

404: transmitting, by the terminal, feedback information corresponding to the first downlink channel on the second time domain unit.

After determining the second time domain unit, the terminal can send the feedback information corresponding to the first downlink channel to the base station through this second time domain unit.

In summary, In the technical solution provided by the embodiment of the present application, through determining a first time domain unit according to a time domain unit occupied by a first downlink channel and time offset information, then determining one second time domain unit for transmitting feedback information corresponding to the first downlink channel after the first time domain unit, and transmitting the feedback information corresponding to the first downlink channel on the second time domain unit, a new means of sending feedback information is provided, such that when there is no such a condition for one-to-one configuration of downlink channel and uplink channel resources, it is still possible to ensure that feedback information can be accurately transmitted between a terminal and a base station, helping to improve robustness of communication.

In an exemplary embodiment, the above step 403 includes: terminal determines the second time domain unit according to an uplink channel time domain resource. The uplink channel time domain resource refers to a time domain resource configured by the base station for the uplink channel, and the uplink channel refers to an uplink physical channel used to send the feedback information, such as a PUCCH. Certainly, in some other examples, the uplink channel may also be a PUSCH (Physical Uplink Shared Channel), which is not limited in the embodiment of the present application.

If a first target time domain unit satisfies the constraint condition of the first uplink channel time domain resource, the terminal determines that the first target time domain unit is the second time domain unit. Where the first target time domain unit is after the first time domain unit.

If the first target time domain unit does not satisfy the constraint condition of the first uplink channel time domain resource, the terminal determines that a second target time domain unit is the second time domain unit. Where the second target time domain unit is after the first target time domain unit, and the second target time domain unit satisfies the constraint condition of the second uplink channel time domain resource.

In an implementation, the terminal determines the first target time domain unit after the first time domain unit; the terminal determines whether the first target time domain unit satisfies the constraint condition of the first uplink channel time domain resource; if the first target time domain unit satisfies the constraint condition of the first uplink channel time domain resource, the terminal determines that the first target time domain unit is a second time domain unit; if the first target time domain unit does not satisfy the constraint condition of the first uplink channel time domain resource, the terminal determines the second target time domain unit after the first target time domain unit; the terminal determines whether the second target time domain unit satisfies the constraint condition of the second uplink channel time domain resource; if the second target time domain unit satisfies the constraint condition of the second uplink channel time domain resource, the terminal determines that the second target time domain unit is the second time domain unit; and if the second target time domain unit does not satisfy the constraint condition of the second uplink channel time domain resource, the terminal continues to determine the time domain unit after the second target time domain unit and performs a similar judgment process as above to finally find the second time domain unit.

In an embodiment of the present application, a time domain subunit refers to a time unit with a smaller granularity than the time domain unit. For example, the time domain unit is a slot, and the time domain subunit may be a symbol. The time domain subunit includes the following three types: uplink subunit, downlink subunit and flexible subunit. The uplink subunit refers to a time domain subunit used for uplink transmission, the downlink subunit refers to a time domain subunit used for downlink transmission, and the flexible subunit refers to a time domain subunit used for performing uplink transmission or downlink transmission according to configuration, that is, transmitting uplink information or downlink information on the flexible subunit according to the scheduling of the base station. When the time domain subunit is a symbol, the uplink subunit, the downlink subunit, and the flexible subunit described above refer to an uplink symbol, a downlink symbol, and a flexible symbol, respectively.

In an implementation, the first target time domain unit may be a time domain unit that includes an uplink subunit and/or a flexible subunit after the first time domain unit. Or, in other examples, the first target time domain unit may also be a time domain unit determined according to third configuration information, and the third configuration information may be configuration information issued by the base station to instruct the terminal to determine the first target time domain unit.

In an implementation, the second target time domain unit may be a time domain unit that includes an uplink subunit and/or a flexible subunit after the first target time domain unit. Or, in other examples, the second target time domain unit may also be a time domain unit determined according to fourth configuration information, and the fourth configuration information may be configuration information issued by the base station to instruct the terminal to determine the second target time domain unit.

The first uplink channel time domain resource and the second uplink channel time domain resource are respectively two uplink channel time domain resources configured by the base station. The first uplink channel time domain resource and the second uplink channel time domain resource may be the same or different. For example, the first uplink channel time domain resource and the second uplink channel time domain resource may occupy the same time domain subunit in one time domain unit, or may occupy different time domain subunits in one time domain unit.

In an implementation, the terminal determines the first uplink channel time domain resource in any of the following ways.

1. The terminal determines a first number of bits of the feedback information for the first target time domain unit, and the terminal determines the first uplink channel time domain resource according to the first number of bits.

The first number of bits refers to the number of bits required when it is assumed that the feedback information corresponding to the first downlink channel is transmitted on the first target time domain unit. According to the first number of bits, the terminal may further select, from the set of uplink channel resources configured by the base station, the first uplink channel resource suitable for transmitting the information of the first number of bits, and then determine the first uplink channel time domain resource based on this selected first uplink channel resource.

2. The terminal determines a first uplink channel time domain resource according to first configuration information; and the first configuration information may be information sent by the base station for configuring the first uplink channel time domain resource, whereby the terminal may determine the first uplink channel time domain resource.

In an implementation, the terminal determines the second uplink channel time domain resource in any of the following ways.

1. The terminal determines a second number of bits of the feedback information for the second target time domain twit; and the terminal determines the second uplink channel time domain resource according to the second number of bits.

The second number of bits refers to the number of bits required when it is assumed that the feedback information corresponding to the first downlink channel is transmitted on the second target time domain unit. According to the second number of bits, the terminal may further select, from the set of uplink channel resources configured by the base station, a second uplink channel resource suitable for transmitting information of this second number of bits, and then determine a second uplink channel time domain resource based on this selected second uplink channel resource.

2. The terminal determines a second uplink channel time domain resource according to second configuration information; and the second configuration information may be information sent by the base station for configuring the second uplink channel time domain resource, whereby the terminal may determine the second uplink channel time domain resource.

In an implementation, the constraint condition of the first uplink channel time domain resource includes any one of the following.

1. A total number of target subunits in the first target time domain unit is greater than or equal to a total number of time domain subunits included in the first uplink channel time domain resource; and the target subunit is an uplink subunit and/or a flexible subunit.

2. Target subunits included in the first target time domain unit include all the time domain subunits included in the first uplink channel time domain resource; and the target subunit is an uplink subunit and/or a flexible subunit. That is, if the uplink subunit and/or the flexible subunit included in the first target time domain unit include all the time domain subunits of the first uplink channel from the start time domain subunit to the end time domain subunit, then the first target time domain unit is determined to satisfy the constraint condition of the first uplink channel time domain resource.

3. In the first target time domain unit, the time domain subunit corresponding to the first uplink channel time domain resource does not include the downlink subunit, or the time domain subunit corresponding to the first uplink channel time domain resource only includes the uplink subunit.

In an implementation, the constraint condition of the time domain resource of the second uplink channel includes any one of the following.

1. A total number of target subunits in the second target time domain unit is greater than or equal to a total number of time domain subunits included in the second uplink channel time domain resource; and the target subunit is an uplink subunit and/or a flexible subunit.

2. Target subunits included in the second target time domain unit include all time domain subunits included in the second uplink channel time domain resource; and the target subunit is an uplink subunit and/or a flexible subunit. That is, if the uplink subunit and/or the flexible subunit included in the second target time domain unit include all of the time domain subunits of the second uplink channel from the start time domain subunit to the end time domain subunit, the second target time domain unit is determined to satisfy the constraint condition of the second uplink channel time domain resource.

3. In the second target time domain unit, the time domain subunit corresponding to the second uplink channel time domain resource does not include the downlink subunit, or the time domain subunit corresponding to the second uplink channel time domain resource only includes the uplink subunit.

In an exemplary embodiment, the terminal starts from the first time domain unit after the first time domain unit, and traverses the time domain units after the first time domain unit one by one. For the currently traversed time domain unit, the terminal performs the following steps.

Step 1, judging, by the terminal, whether the target subunit is included in the time domain unit currently traversed; if yes, going to step 2 below; and if not, going to step 5 below.

In an implementation, if a format of the currently traversed time domain unit is configured through a high-level signaling, the target subunit includes an uplink subunit and/or a flexible subunit; or, if the format of the currently traversed time domain unit is configured through a physical layer signaling, the target subunit includes an uplink subunit.

Step 2, determining, by the terminal, the time domain resources occupied by the first uplink channel.

The first uplink channel is used to transmit feedback information corresponding to the downlink channel. In an implementation, the first uplink channel is PUCCH.

In an implementation, the determining, by the terminal, the time domain resources occupied by the first uplink channel includes: the terminal determines a number of bits required to send feedback information in the current traversed time domain unit; and the terminal determines the time domain resource occupied by the first uplink channel according to the number of bits; or, the terminal receives configuration information, which is used to indicate the resources occupied by the first uplink channel; and the terminal determines the time domain resources occupied by the first uplink channel according to the configuration information.

Step 3, judging, by the terminal, whether the target subunit included in the currently traversed time domain unit includes the time domain resource occupied by the first uplink channel, if yes, going to step 4 below; and if not, going to step 5 below.

In an implementation, when meeting any of the following situations, the target subunit included in the currently traversed time domain unit includes the time domain resource occupied by the first uplink channel:

(1) the total number of target subunits in the time domain unit currently traversed is greater than or equal to the total number of time domain subunits included in the time domain resources occupied by the first uplink channel;

(2) the target subunits included in the currently traversed time domain unit include all time domain subunits included in the time domain resources occupied by the first uplink channel; and (3) in the currently traversed time domain unit, the time domain resource occupied by the first uplink channel does not include the downlink subunit, or the time domain resource occupied by the first uplink channel only includes the uplink subunit.

In an implementation, the time domain resource occupied by the first uplink channel above include: a time domain unit occupied by the first uplink channel and a time domain subunit occupied in a time domain unit; or, a time domain subunit occupied by the first uplink channel within a time domain unit.

Step 4, determining, by the terminal, that the currently traversed time domain unit is the second time domain unit.

The second time domain unit is used to transmit the feedback information corresponding to the first downlink channel. If the target subunit included in the currently traversed time domain unit includes the time domain resources occupied by the first uplink channel, the terminal will determine the currently traversed time domain unit as the second time domain unit for the transmission of the feedback information.

In addition, when the terminal determines the second time domain unit, the terminal stops traversing.

Step 5, continuing, by the terminal, to traverse a next time domain unit.

Figure 5:
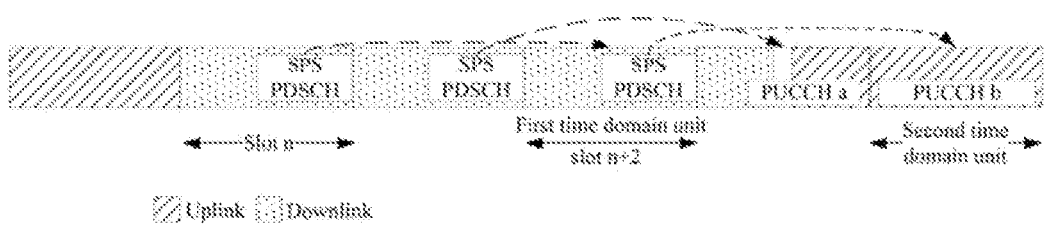
FIG. 5 schematically illustrates a schematic diagram of determining a second time domain unit.

For example, as shown in FIG. 5, taking the first downlink channel as the SPS PDSCH as an example, it is assumed that the SPS PDSCH adopts a 1 ms (millisecond) period, that is, there is one SPS PDSCH in each downlink slot. The base station configures the time offset information k=2, that is, occupying 2 slots, then the feedback information corresponding to the SPS PDSCH received in slot n is transmitted in slot n+2 and a slot after it that firstly satisfies the condition. For the SPS PDSCH transmitted in slot n, the first time domain unit is obtained as slot n+2. As shown in FIG. 5, since slot n+2 is a downlink slot, the terminal needs to determine the second time domain unit. The terminal continues to search for a next slot, and slot n+3 is a slot that firstly includes uplink resources after slot n+2. The terminal determines that the total number of bits of ACK/NACK corresponding to all SPS PDSCHs without ACK/NACK feedback before slot n+3 is 2 bits (assuming one SPS PDSCH corresponds to 1 bit), specifically, which is the feedback information corresponding to the SPS PDSCHs within slots n~n+1. Transmission of 2-bit feedback information pre-configured by the base station uses PUCCH resource a. As shown in FIG. 5, in slot n+3, since some of the time domain symbols in the time domain unit occupied by PUCCH resource a are downlink symbols, slot n+3 does not satisfy the constraint conditions, and the terminal continues to search for the next slot, that is, judges slot n+4. The terminal determines that the total number of bits of ACK/NACK corresponding to all SPS PDSCHs without ACK/NACK feedback before slot n+4 is 3 bits, specifically, which is the feedback information corresponding to the SPS PDSCHs within slots n~n+2. Transmission of 3-bit feedback information pre-configured by the base station uses PUCCH resource b. As shown in FIG. 5, in slot n+4, since all the time domain symbols in the time domain unit occupied by PUCCH resource b are uplink symbols, slot n+4 satisfies the constraint condition, and the terminal determines slot n+4 as the second time domain unit. The terminal transmits feedback information corresponding to the SPS PDSCH in the slots n~n+2 on the PUCCH resource b of the slot n+4.

In summary, in the technical solution provided by the embodiment of the present application, by traversing the time domain units after the first time domain unit one by one to find the second time domain unit that satisfies the constraint condition to transmit the feedback information of the first downlink channel, thus, it can make full use of the uplink resources wile satisfying the PUCCH resources pre-configured by the base station, thereby improving the system efficiency and reducing the HARQ feedback delay. In addition, in the technical solution provided by the embodiment of the present application, the feedback information corresponding to the first downlink channel is not required to be transmitted in a complete uplink slot, that is, in the embodiment of the present application, the feedback information can be transmitted in a mixed slot including both uplink and downlink resources, thus the improvement of system efficiency and the reduction of HARQ feedback delay are further achieved.

In the above embodiments, the method for determining the second time domain unit is described and illustrated mainly by taking the terminal determining the second time resource according to the uplink channel time domain resource as an example. In some other possible embodiments, the terminal may also determine the second time domain unit in the following manner.

1. The terminal determines a second time domain unit, and all time domain subunits in the second time domain unit are uplink subunits and/or flexible subunits.

That is, if all the time domain subunits included in a certain time domain unit after the first time domain unit are all uplink subunits, or are all flexible subunits, or are all uplink subunits and flexible subunits, the terminal determines that the time domain unit is the second time domain unit.

2. When there is a plurality of overlapping uplink channels in the first time domain unit, the terminal determines to transmit the feedback information corresponding to the first downlink channel and at least part of the content carried in the plurality of overlapping uplink channels by using the target uplink channel multiplexing; and the second time domain unit is the time domain unit in which the target uplink channel is located.

Figure 6:
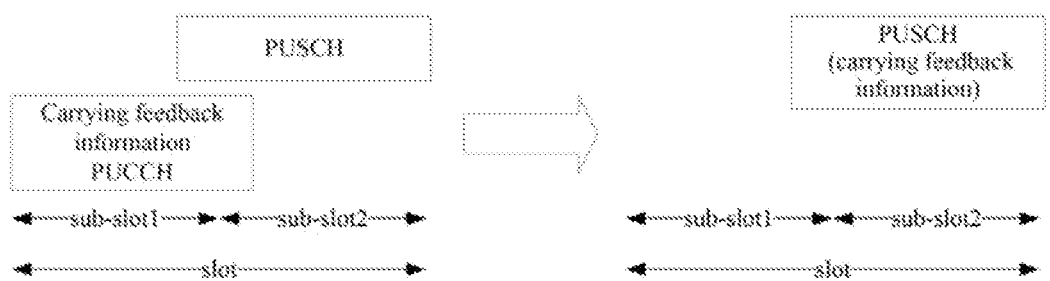
FIG. 6 schematically illustrates a schematic diagram of multiplexing and transmitting feedback information on PUSCH.

The plurality of overlapping uplink channels in the first time domain unit may be uplink channels of the same type, or uplink channels of different types, such as PUCCH and PUSCH, which are not limited in the embodiment of the present application. For example, as shown in FIG. 6, there are two overlapping uplink channels which are PUSCH and PUCCH in the first time domain unit (one slot), and the feedback information corresponding to the first downlink channel is carried in a PUCCH. As shown in FIG. 6, this PUCCH carrying the feedback information is transmitted in sub-slot 1, but overlaps with the PUSCH in the time domain. When the processing delay requirement is satisfied, the feedback information can be multiplexed and transmitted in the PUSCH without transmitting the PUCCH.

In an implementation, the second time domain unit is the time domain unit where the end position of the target uplink channel is located. For example, as shown in FIG. 6, since the PUSCH occupies sub-slot 1 and sub-slot 2, the second time domain unit is sub-slot 2.

In the above manner, the requirement that the terminal in the NR system can only transmit at most one uplink channel in one carrier can be satisfied, and the transmission of feedback information can be guaranteed.

In an exemplary embodiment, the second time domain unit is the time domain unit that firstly satisfies the constraint condition after the first time domain unit. In an implementation, the constraint includes any of the following.

Figure 7:
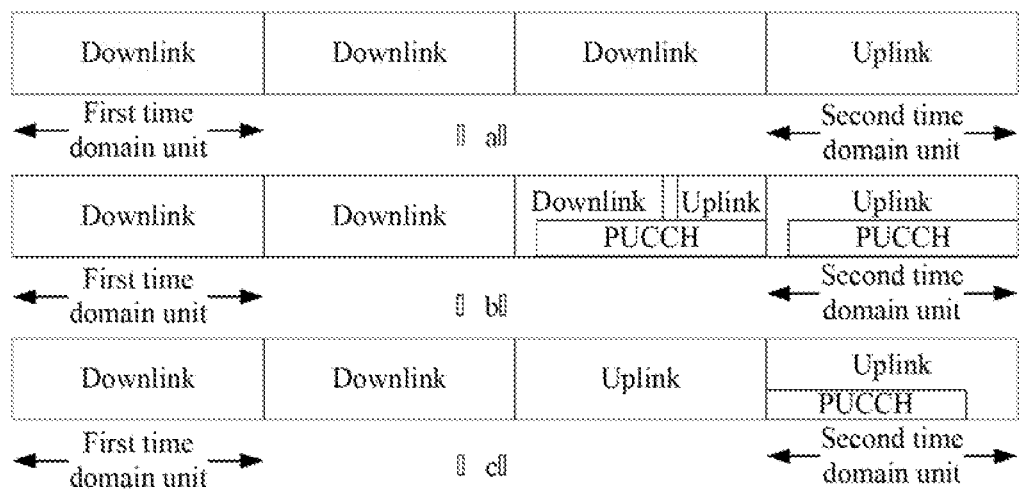
FIG. 7 schematically illustrates another schematic diagram of determining a second time domain unit.

(1) The time domain subunits included in the second time domain unit are all uplink subunits;

for example, all the time domain symbols included in the slot corresponding to the second time domain unit are uplink symbols. Exemplarily, as shown in (a) in FIG. 7, taking the time domain unit as the slot as an example, all the symbols included in the 4th slot are uplink symbols, therefore, it is determined that this 4th slot is the second time domain unit.

(2) The terminal receives the base station configuration information to get the first uplink channel time domain resource. In the second time domain unit, the first uplink channel time domain resource includes an uplink subunit and/or a flexible subunit. The above configuration information may include information about the time domain symbols occupied by the first uplink channel in a time domain unit, such as length, start symbol, etc. As shown in (b) in FIG. 7, taking the time domain unit as the slot and the time domain subunit as the symbol as an example, although the 3rd slot contains uplink symbol, the PUCCH occupies downlink symbols in addition to uplink symbols in this 3rd slot, so this 3rd time domain symbol does not satisfy the constraint condition. The PUCCH only occupies uplink symbols and does not occupy downlink symbols in the 4th slot. Therefore, the 4th slot is determined to be the second time domain unit.

(3) The terminal receives the base station configuration information to obtain the second uplink channel time domain resource. The second time domain unit includes all time domain subunits of the second uplink channel time domain resource. The above configuration information may include a time domain unit corresponding to the second uplink channel, and time domain symbol information occupied by the second uplink channel in the time domain unit. As shown in (c) in FIG. 7, although the 3rd slot includes uplink symbols, the PUCCH is not configured in the 3rd slot, and the PUCCH is configured to occupy part of the symbols in the 4th slot, and this 4th slot includes all the symbols occupied by the second uplink channel, therefore, this 4th slot is determined as the second time domain unit.

In an exemplary embodiment, before determining the second time domain unit, the terminal determines that the first time domain unit is consistent with any one of the following:

(1) at least part of the resources in the first time domain unit are not uplink transmission resources;

(2) at least part of the resources in the first time domain unit are downlink transmission resources;

(3) at least part of the resources in the first time domain unit is used for downlink transmission; that is, at least part of the resources in the first time domain unit are downlink transmission resources and/or flexible transmission resources used for downlink transmission;

(4) at least part of the resources in the first time domain unit is used to transmit other uplink signals or channels; that is, not all of the resources in the first time domain unit are used to transmit uplink channels carrying the feedback information;

(5) there is no first uplink channel resource in the first time domain unit; and (6) the terminal receives the first control signaling, where the first control signaling is used to instruct the terminal to stop or cancel transmitting the feedback information corresponding to the first downlink channel on the first time domain unit.

In the embodiment of the present application, if the first time domain unit is consistent with any of the above, it means that the first time domain unit may not be used to transmit the feedback information corresponding to the first downlink channel, and thus the terminal needs to determine a second time domain unit to transmit the feedback information after the first time domain unit. In other words, if the first time domain unit can be used to transmit the feedback information corresponding to the first downlink channel, such as each of the above (1) to (6) is not met by the first time domain unit, the terminal determines to use that first time domain unit to transmit the feedback information corresponding to the first downlink channel.

Figure 8:
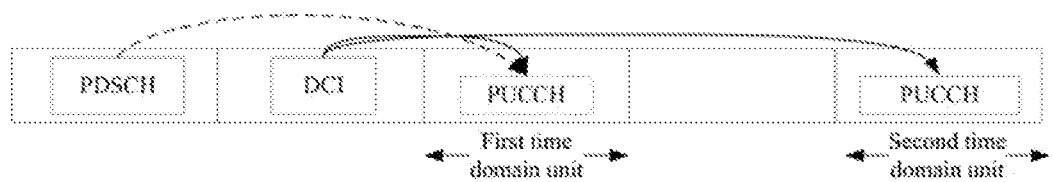
FIG. 8 schematically illustrates another schematic diagram of determining a second time domain unit.

For point (6) above, the base station may determine whether the terminal can transmit the feedback information corresponding to the first downlink channel on the first time domain unit, and if determining that the terminal cannot transmit the feedback information on the first time domain unit, the base station sends a first control command to the terminal, where the first control command is used to inform the terminal to stop or cancel transmitting the feedback information corresponding to the first downlink channel on the first time domain unit. For example, as shown in FIG. 8, the terminal determines to transmit the feedback information corresponding to the PDSCH on the first time domain unit, and if the terminal receives a DCI signaling sent by the base station, where the DCI signaling is used to instruct the terminal to cancel transmitting the feedback information on the first time domain unit, the terminal does not transmit the feedback information in the first time domain unit. In an implementation, the base station may also send a second control signaling to the terminal, where the second control signaling is used to instruct the terminal to transmit feedback information in the second time domain unit, and then the terminal transmits the feedback information in the second time domain unit. The above first control signaling and second control signaling may be one signaling or two signaling, which is not limited to the embodiment of the present application.

Through the above method, the base station can control the feedback information to be sent on the appropriate time domain unit according to the actual use requirements of the time domain unit.

In an exemplary embodiment, after the terminal determines the second time domain unit, further including:

the terminal does not expect to receive the first signaling before the second time domain unit, where the first signaling is used to instruct the terminal to receive the second downlink channel; in an implementation, the terminal does not expect to receive the first signaling before the end position of the second time domain unit;

or, the terminal does not expect to receive the second downlink channel before the second time domain unit; In an implementation, the terminal does not expect to receive the second downlink channel before the end position of the second time domain unit;

or, the terminal detects the first signaling after the second time domain unit, where the first signaling is used to instruct the terminal to receive the second downlink channel; In an implementation, the terminal detects the first signaling after the end position of the second time domain unit;

or, the terminal receives the second downlink channel after the second time domain unit; In an implementation, the terminal receives the second downlink channel after the end position of the second time domain unit;

where the number of the HARQ process carried by the second downlink channel is the same as the number of the HARQ process carried by the first downlink channel.

In summary, in the technical solution provided by the embodiment of the present application, after the time of transmission of the feedback information of the first downlink channel is changed relative to the initial configuration of the base station, the reuse time of the HARQ process can be determined according to the actual transmission time, thereby avoiding deviations in the understanding of process scheduling between the terminal and the base station.

An embodiment of the present application also provides an information receiving method, which can be applied in the base station of the network architecture shown in FIG. 1, and the method can include the following steps: the base station transmits a first downlink channel; the base station receives feedback information corresponding to the first downlink channel transmitted on a second time domain unit; where the second time domain unit is a time domain unit after a first time domain unit, and the first time domain unit is determined according to a time domain unit occupied by the first downlink channel and time offset information.

In a possible implementation, before the base station receives the feedback information corresponding to the first downlink channel transmitted on the second time domain unit, the method further includes: the base station sends a first control signaling, where the first control signaling is used for instructing to stop or cancel transmitting the feedback information corresponding to the first downlink channel on the first time domain unit.

For the introduction and description of the embodiment on the base station side, please refer to the relevant introduction and description in the above the embodiment on the terminal side, which will not be repeated here.

The following are apparatus embodiments of the present application, which may be used to execute the method embodiments of the present application. For details not disclosed in the apparatus embodiments of the present application, please refer to the method embodiments of the present application.

Figure 9:
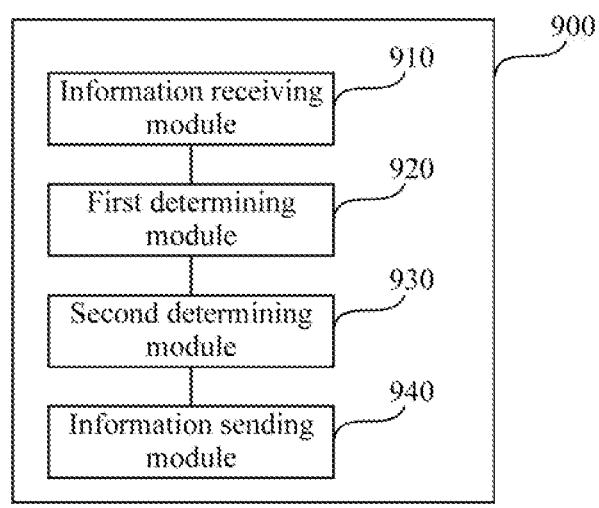
FIG. 9 is a block diagram of an information sending apparatus provided by an embodiment of the present application.

Please refer to FIG. 9, which shows a block diagram of an information sending apparatus provided by an embodiment of the present application. The apparatus has a function of realizing the above example of the information sending method, and the function can be realized by hardware, or by hardware executing corresponding software. The apparatus may be the terminal described above, or may be set in the terminal. As shown in FIG. 9, the apparatus 900 may include: an information receiving module 910, a first determining module 920, a second determining module 930, and an information sending module 940.

The information receiving module 910 is configured to receive the first downlink channel.

The first determining module 920 is configured to determine the first time domain unit according to a time domain unit occupied by the first downlink channel and time offset information.

The second determining module 930 is configured to determine a second time domain unit, where the second time domain unit is after the first time domain unit.

The information sending module 940 is configured to transmit feedback information corresponding to the first downlink channel on the second time domain unit.

Figure 10:
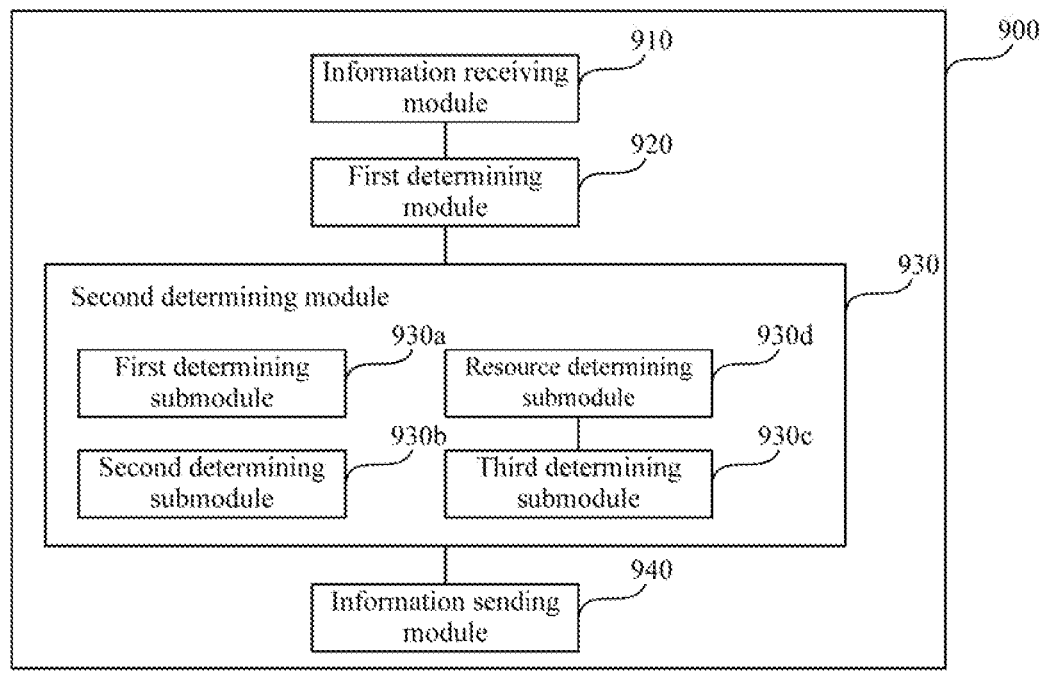
FIG. 10 is a block diagram of an information sending apparatus provided by another embodiment of the present application.

In an exemplary embodiment, as shown in FIG. 10, the second determining module 930 includes:

a first determining submodule 930a, configured to determine the second time domain unit, where all time domain subunits in the second time domain unit are uplink subunits and/or flexible subunits; or, a second determining submodule 930b, configured to determine to transmit the feedback information corresponding to the first downlink channel and at least part of content carried in a plurality of overlapping uplink channels using a target uplink channel multiplexing, when the plurality of overlapping uplink channels exist within the first time domain unit; where the second time domain unit is a time domain unit in which the target uplink channel is located; or a third determining submodule 930c, configured to determine the second time domain unit according to an uplink channel time domain resources;

where the uplink subunit refers to a time domain subunit used for uplink transmission, and the flexible subunit refers to a time domain subunit used for uplink transmission or downlink transmission according to configuration.

In an exemplary embodiment, the third determining submodule 930c is configured to, if a first target time domain unit satisfies a constraint condition of a first uplink channel time domain resource, determine that the first target time domain unit is the second time domain unit, where the first target time domain unit is after the first time domain unit.

In an exemplary embodiment, the third determining submodule 930c is configured to, if a first target time domain unit does not satisfy a constraint condition of a first uplink channel time domain resource, determine that a second target time domain unit is the second time domain unit;

where the first target time domain unit is after the first time domain unit, the second target time domain unit is after the first target time domain unit, and the second target time domain unit satisfies a constraint condition of a second uplink channel time domain resource.

In an exemplary embodiment, as shown in FIG. 10, the second determining module 930 further includes: a resource determining sub-module 930d.

In an implementation, the resource determination submodule 930d is configured to determine the first uplink channel time domain resource according to first configuration information; or, determine a first number of bits of feedback information for the first target time domain unit; and determine the first uplink channel time domain resource according to the first number of bits.

In an implementation, the resource determination submodule 930d is configured to determine the second uplink channel time domain resource according to second configuration information; or, determine a second number of bits of feedback information for the second target time domain unit; and determine the second uplink channel time domain resource according to the second number of bits.

In an exemplary embodiment, the first target time domain unit includes:

a time domain unit determined according to third configuration information; or, a time domain unit, after the first time domain unit, including an uplink subunit and/or a flexible subunit.

In an exemplary embodiment, the second target time domain unit includes:

a time domain unit determined according to fourth configuration information; or, a time domain unit, after the first target time domain unit, including an uplink subunit and/or a flexible subunit.

In an exemplary embodiment, the constraint condition of the first uplink channel time domain resource includes:

a total number of target subunits in the first target time domain unit is greater than or equal to a total number of time domain subunits included in the first uplink channel time domain resource; or, target subunits included in the first target time domain unit include all time domain subunits included in the first uplink channel time domain resource; or, in the first target time domain unit, a time domain subunit corresponding to the first uplink channel time domain resource does not include a downlink subunit, or the time domain subunit corresponding to the first uplink channel time domain resource only includes uplink subunit;

where, the target subunit is an uplink subunit and/or a flexible subunit, and the downlink subunit refers to a time domain subunit used for downlink transmission.

In an exemplary embodiment, the constraint condition of the second uplink channel time domain resource includes:

a total number of target subunits in the second target time domain unit is greater than or equal to a total number of time domain subunits included in the second uplink channel time domain resource; or, target subunits included in the second target time domain unit include all time domain subunits included in the second uplink channel time domain resource; or, in the second target time domain unit, the time domain subunit corresponding to the second uplink channel time domain resource does not include a downlink subunit, or the time domain subunit corresponding to the second uplink channel time domain resource only includes an uplink subunit, where the target subunit is an uplink subunit and/or a flexible subunit, and the downlink subunit refers to a time domain subunit used for downlink transmission.

In an exemplary embodiment, the second time domain unit is a time domain unit that firstly satisfies a constraint condition after the first time domain unit.

In an exemplary embodiment, before the terminal determines the second time domain unit, the terminal determines that the first time domain unit complies with any one of the following:

at least part of resources in the first time domain unit are not uplink transmission resources;

at least part of resources in the first time domain unit are downlink transmission resources;

at least part of resources in the first time domain unit are used for downlink transmission;

at least part of resources in the first time domain unit are used to transmit other uplink signals or channels;

the first uplink channel resource is absent in the first time domain unit; and the terminal receives a first control signaling, and the first control signaling is used to instruct the terminal to stop or cancel transmitting the feedback information corresponding to the first downlink channel on the first time domain unit.

In an exemplary embodiment, the information receiving module 910 is further configured to:

not be expected to receive a first signaling before the second time domain unit, where the first signaling is used to instruct the terminal to receive a second downlink channel; or, not be expected to receive a second downlink channel before the second time domain unit; or, detect a first signaling after the second time domain unit, where the first signaling is used to instruct the terminal to receive a second downlink channel; or, receive a second downlink channel after the second time domain unit;

where, a number of a HARQ process carried by the second downlink channel is the same as a number of a HARQ process carried by the first downlink channel.

Figure 11:
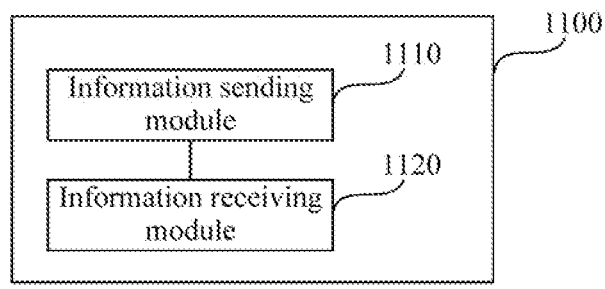
FIG. 11 is a block diagram of an information receiving apparatus provided by an embodiment of the present application.

Please refer to FIG. 11, which shows a block diagram of an information receiving apparatus provided by an embodiment of the present application. The apparatus has a function of realizing the above example of the information receiving method, and the function can be realized by hardware, or by hardware executing corresponding software. The apparatus may be the base station described above, or may be set in the base station. As shown in FIG. 11, the apparatus 1100 may include: an information sending module 1110 and an information receiving module 1120.

The information sending module 1110 is configured to send the first downlink channel.

The information receiving module 1120 is configured to receive feedback information corresponding to the first downlink channel transmitted on the second time domain unit.

The second time domain unit is a time domain unit after the first time domain unit, and the first time domain unit is determined according to the time domain unit occupied by the first downlink channel and time offset information.

In the exemplary embodiment, the information sending module 1110 is further configured to send a first control signaling, where the first control signaling being used to instruct to stop or cancel the transmitting the feedback information corresponding to the first downlink channel on the first time domain unit.

It should be noted that the above embodiment provides the apparatus in realizing its functions, only taking the above division of each functional module as an example for illustration, in actual application, according to the actual needs, the above functions can be assigned by different functional modules to complete, that is, the content structure of the device is divided into different functional modules, so as to complete all or part of the above-described functions.

Regarding the apparatus in the above embodiment, the specific manner in which each module performs the operation has been described in detail in the related method embodiment, and will not be described in detail here.

Figure 12:
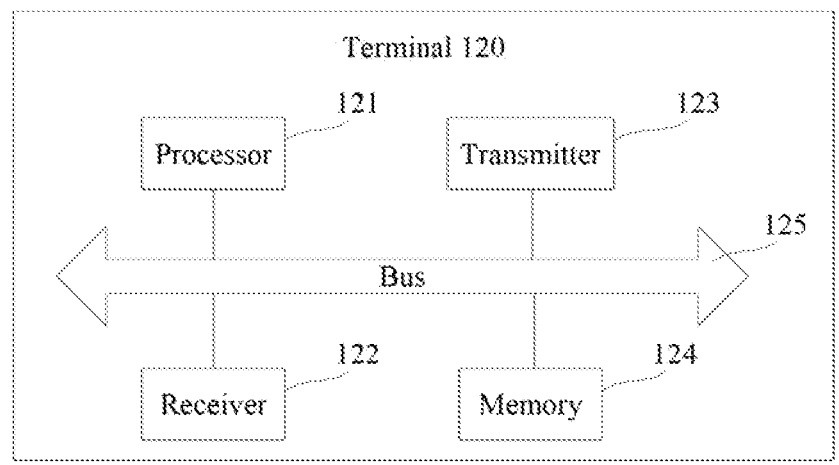
FIG. 12 is a schematic structural diagram of a terminal provided by an embodiment of the present application.

Please refer to FIG. 12, which shows a schematic structural diagram of a terminal 120 provided by an embodiment of the present application. The terminal 120 may include: a processor 121, a receiver 122, a transmitter 123, a memory 124, and a bus 125.

The processor 121 includes one or more processing cores, and the processor 121 executes various functional applications and information processing by running software programs and modules.

The receiver 122 and the transmitter 123 may be implemented as a communication component, and the communication component may be a communication chip.

The memory 124 is connected to the processor 121 through the bus 125.

The memory 124 can store a computer program, and the processor 121 is used to execute the computer program to implement each step of the information sending method executed by the terminal in the above method embodiment.

In addition, the memory 124 may be implemented by any type of volatile or non-volatile storage device or a combination thereof. The volatile or non-volatile storage device includes, but is not limited to: a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

In an exemplary embodiment, the terminal includes a processor, a memory, and a transceiver (the transceiver may include a receiver and a transmitter, the receiver is used to receive information, and the transmitter is used to send information);

the transceiver is configured to receive a first downlink channel;

the processor is configured to determine a first time domain unit according to the time domain unit occupied by the first downlink channel and time offset information;

the processor is further configured to determine a second time domain unit, where the second time domain unit is after the first time domain unit; and the transceiver is also configured to transmit feedback information corresponding to the first downlink channel on the second time domain unit.

In an implementation, the processor is configured to:

determine the second time domain unit, where all time domain subunits in the second time domain unit are uplink subunits and/or flexible subunits; or, determine to transmit the feedback information corresponding to the first downlink channel and at least part of content carried in a plurality of overlapping uplink channels using a target uplink channel multiplexing, when the plurality of overlapping uplink channels exist within the first time domain unit; where the second time domain unit is a time domain unit in which the target uplink channel is located; or determine the second time domain unit according to an uplink channel time domain resource;

where the uplink subunit refers to a time domain subunit used for uplink transmission, and the flexible subunit refers to a time domain subunit used for uplink transmission or downlink transmission according to configuration.

In an implementation, the processor is configured to: if a first target time domain unit satisfies a constraint condition of a first uplink channel time domain resource, determine that the first target time domain unit is the second time domain unit, where the first target time domain unit is after the first time domain unit.

In an implementation, the processor is configured to: if a first target time domain unit does not satisfy a constraint condition of a first uplink channel time domain resource, determine that a second target time domain unit is the second time domain unit;

where the first target time domain unit is after the first time domain unit, the second target time domain unit is after the first target time domain unit, and the second target time domain unit satisfies a constraint condition of a second uplink channel time domain resources.

In an implementation, the processor is further configured to: determine the first uplink channel time domain resource according to first configuration information; or, determine a first number of bits of feedback information for the first target time domain unit; and determine the first uplink channel time domain resource according to the first number of bits.

In an implementation, the processor is further configured to: determine the second uplink channel time domain resource according to second configuration information; or, determine a second number of bits of feedback information for the second target time domain unit; and determine the second uplink channel time domain resource according to the second number of bits.

In an implementation, the first target time domain unit includes: a time domain unit determined according to third configuration information; or, a time domain unit, after the first time domain unit, including an uplink subunit and/or a flexible subunit.

In an implementation, the second target time domain unit includes: a time domain unit determined according to fourth configuration information; or, a time domain unit, after the first target time domain unit, including an uplink subunit and/or a flexible subunit.

In an implementation, the constraint condition of the first uplink channel time domain resource includes:

a total number of target subunits in the first target time domain unit is greater than or equal to a total number of time domain subunits included in the first uplink channel time domain resource; or, target subunits included in the first target time domain unit include all time domain subunits included in the first uplink channel time domain resource; or, in the first target time domain unit, a time domain subunit corresponding to the first uplink channel time domain resource does not include a downlink subunit, or the time domain subunit corresponding to the first uplink channel time domain resource only includes an uplink subunit;

where the target subunit is an uplink subunit and/or a flexible subunit, and the downlink subunit refers to a time domain subunit used for downlink transmission.

In an implementation, the constraint condition of the second uplink channel time domain resource includes:

a total number of target subunits in the second target time domain unit is greater than or equal to a total number of time domain subunits included in the second uplink channel time domain resource; or, target subunits included in the second target time domain unit include all time domain subunits included in the second uplink channel time domain resource; or, in the second target time domain unit, a time domain subunit corresponding to the second uplink channel time domain resource does not include a downlink subunit, or the time domain subunit corresponding to the second uplink channel time domain resource only includes uplink subunit;

where the target subunit is an uplink subunit and/or a flexible subunit, and the downlink subunit refers to a time domain subunit used for downlink transmission.

In an implementation, the second time domain unit is a time domain unit that firstly satisfies a constraint condition after the first time domain unit.

In an implementation, before the terminal determines the second time domain unit, the terminal determines that the first time domain unit complies with any one of the following:

at least part of resources in the first time domain unit are not uplink transmission resources;

at least part of resources in the first time domain unit are downlink transmission resources;

at least part of resources in the first time domain unit are used for downlink transmission;

at least part of resources in the first time domain unit are used to transmit other uplink signals or channels;

the first uplink channel resource is absent in the first time domain unit; and the terminal receives a first control signaling, and the first control signaling is used to instruct the terminal to stop or cancel transmitting the feedback information corresponding to the first downlink channel on the first time domain unit.

In an implementation, the processor is further configured to not be expected to receive a first signaling before the second time domain unit, where the first signaling is used to instruct the terminal to receive a second downlink channel; or, the processor is further configured to not be expected to receive a second downlink channel before the second time domain unit; or, the transceiver is further configured to detect a first signaling after the second time domain unit, where the first signaling is used to instruct the terminal to receive a second downlink channel; or, the transceiver is further configured to receive a second downlink channel after the second time domain unit;

where a number of a HARQ process carried by the second downlink channel is the same as a number of a HARQ process carried by the first downlink channel.

Figure 13:
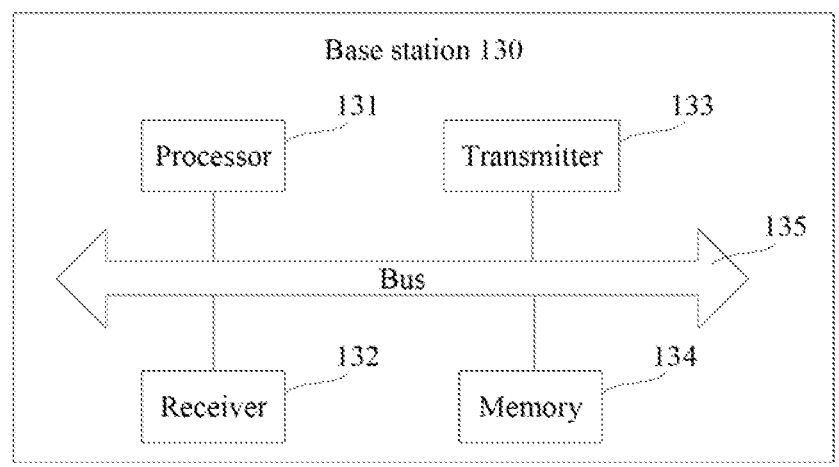
FIG. 13 is a schematic structural diagram of a base station provided by an embodiment of the present application.

Referring to FIG. 13, which shows a schematic structural diagram of a base station 130 provided by an embodiment of the present application, the base station 130 may include: a processor 131, a receiver 132, a transmitter 133, a memory 134, and a bus 135.

The processor 131 includes one or more processing cores, and the processor 131 executes various functional applications and information processing by running software programs and modules.

The receiver 132 and the transmitter 133 may be implemented as a communication component, and the communication component may be a communication chip.

The memory 134 is connected to the processor 131 through the bus 135.

The memory 134 is capable of storing a computer program, and the processor 131 is used to execute the computer program to implement each step of the information receiving method executed by the base station in the above method embodiment.

In addition, the memory 134 can be implemented by any type of volatile or non-volatile storage device or a combination thereof. The volatile or non-volatile storage device includes, but is not limited to: a magnetic disk or an optical disk, an electrically erasable and programmable read-only memory (EEPROM), an erasable programmable read-only memory (EPROM), a static random access memory (SRAM), a read-only memory (ROM), a magnetic memory, a flash memory, a programmable read-only memory (PROM).

In an exemplary embodiment, the base station includes a processor, a memory, and a transceiver (the transceiver may include a receiver and a transmitter, the receiver is used for receiving information, and the transmitter is used for sending information);

the transceiver is configured to send a first downlink channel;

the transceiver is further configured to receive feedback information corresponding to the first downlink channel transmitted on a second time domain unit;

where the second time domain unit is a time domain unit after the first time domain unit, and the first time domain unit is determined according to the time domain unit occupied by the first downlink channel and time offset information.

In an implementation, the transceiver is further configured to send a first control signaling, where the first control signaling is used to instruct to stop or cancel transmitting feedback information corresponding to the first downlink channel on the first time domain unit.

An embodiment of the present application also provides a computer-readable storage medium having a computer program stored thereon, and the computer program is loaded and executed by a processor to implement the information sending method as described above.

An embodiment of the present application also provides a computer-readable storage medium having a computer program stored thereon, and the computer program is loaded and executed by a processor to implement the information receiving method as described above.

The present application also provides a computer program product which, when running on a terminal, causes the terminal to execute the above information sending method.

The present application also provides a computer program product which, when running on a terminal, causes the terminal to execute the above information receiving method.

Those skilled in the art should be aware that, in one or more of the above examples, the functions described in the embodiments of the present application may be implemented by hardware, software, firmware, or any combination thereof. When implemented by using software, these functions may be stored in a computer-readable medium or transmitted as one or more instructions or codes on a computer-readable medium. The computer-readable medium includes a computer storage medium and a communication medium, where the communication medium includes any medium that facilitates the transfer of a computer program from one place to another. The storage medium may be any available medium that can be accessed by a general-purpose or a special-purpose computer.

The above mentioned are only exemplary embodiments of the present application and are not intended to limit the present application. Any modifications, equivalent substitutions, improvements, etc. made within the spirit and principles of the present application shall be included in the scope of protection of the present application.

What is claimed is:

1. An information sending method, comprising:
receiving, by a terminal, a first downlink channel, wherein the first downlink channel is a semi-persistent scheduling physical downlink shared channel (SPS PDSCH);
determining, by the terminal, a first time domain unit according to a time domain unit occupied by the first downlink channel and time offset information;
determining, by the terminal, a second time domain unit according to an uplink channel time domain resource, if the first time domain unit is unavailable for transmitting feedback information corresponding to the first downlink channel, wherein the second time domain unit is after the first time domain unit; and
transmitting, by the terminal, feedback information corresponding to the first downlink channel on the second time domain unit;

wherein the determining, by the terminal, the second time domain unit according to the uplink channel time domain resource comprises:
  if a first target time domain unit satisfies a constraint condition of a first uplink channel time domain resource, determining, by the terminal, that the first target time domain unit is the second time domain unit, wherein the first target time domain unit is after the first time domain unit;
  wherein the constraint condition of the first uplink channel time domain resource comprises:
  in the first target time domain unit, a time domain subunit corresponding to the first uplink channel time domain resource does not comprise a downlink subunit; wherein the downlink subunit refers to a time domain subunit used for downlink transmission.

2. The method according to claim 1, wherein the determining, by the terminal, the second time domain unit according to the uplink channel time domain resource comprises:
  if a first target time domain unit does not satisfy a constraint condition of a first uplink channel time domain resource, determining, by the terminal, that a second target time domain unit is the second time domain unit;
  wherein the first target time domain unit is after the first time domain unit, the second target time domain unit is after the first target time domain unit, and the second target time domain unit satisfies a constraint condition of a second uplink channel time domain resource;
  wherein the constraint condition of the second uplink channel time domain resource comprises:
  in the second target time domain unit, a time domain subunit corresponding to the second uplink channel time domain resource does not comprise a downlink subunit; wherein the downlink subunit refers to a time domain subunit used for downlink transmission.

3. The method according to claim 2, further comprising:
  determining, by the terminal, the second uplink channel time domain resource according to second configuration information; or,
  determining, by the terminal, a second number of bits of feedback information for the second target time domain unit; and determining, by the terminal, the second uplink channel time domain resource according to the second number of bits.

4. The method according to claim 1, wherein the first target time domain unit comprises:
  a time domain unit, after the first time domain unit, comprising at least one of an uplink subunit or a flexible subunit.

5. The method according to claim 1, wherein the second time domain unit is a time domain unit that firstly satisfies a constraint condition after the first time domain unit.

6. The method according to claim 1, wherein the first time domain unit is unavailable for transmitting the feedback information corresponding to the first downlink channel comprises one of the following situations:
  at least part of resources in the first time domain unit are downlink transmission resources;
  at least part of resources in the first time domain unit are used for downlink transmission; and
  the first uplink channel time domain resource is absent in the first time domain unit.

7. The method according to claim 1, wherein a symbol in the first time domain unit occupied by an uplink channel comprises a downlink symbol.

8. An information sending apparatus, applied to a terminal, wherein the apparatus comprises a processor, a memory, and a transceiver;
  the transceiver is configured to:
  receive a first downlink channel, wherein the first downlink channel is a semi-persistent scheduling physical downlink shared channel (SPS PDSCH);
  the processor is configured to:
  determine a first time domain unit according to a time domain unit occupied by the first downlink channel and time offset information;
  determine a second time domain unit according to an uplink channel time domain resource, if the first time domain unit is unavailable for transmitting feedback information corresponding to the first downlink channel, wherein second time domain unit is after the first time domain unit; and
  the transceiver is further configured to:
  transmit the feedback information corresponding to the first downlink channel on the second time domain unit;
  wherein the processor is configured to:
  if a first target time domain unit satisfies a constraint condition of a first uplink channel time domain resource, determine that the first target time domain unit is the second time domain unit, wherein the first target time domain unit is after the first time domain unit;
  wherein the constraint condition of the first uplink channel time domain resource comprises:
  in the first target time domain unit, a time domain subunit corresponding to the first uplink channel time domain resource does not comprise a downlink subunit; wherein the downlink subunit refers to a time domain subunit used for downlink transmission.

9. The apparatus according to claim 8, wherein the processor is further configured to,
  if a first target time domain unit does not satisfy a constraint condition of a first uplink channel time domain resource, determine that a second target time domain unit is the second time domain unit;
  wherein the first target time domain unit is after the first time domain unit, the second target time domain unit is after the first target time domain unit, and the second target time domain unit satisfies a constraint condition of a second uplink channel time domain resource,
  wherein the constraint condition of the second uplink channel time domain resource comprises:
  in the second target time domain unit, a time domain subunit corresponding to the second uplink channel time domain resource does not comprise a downlink subunit; wherein the downlink subunit refers to a time domain subunit used for downlink transmission.

10. The apparatus according to claim 9, wherein the processor is further configured to
  determine the second uplink channel time domain resource according to second configuration information; or,
  determine a second number of bits of feedback information for the second target time domain unit; and determine the second uplink channel time domain resource according to the second number of bits.

11. The apparatus according to claim 8, wherein the first target time domain unit comprises:
  a time domain unit, after the first time domain unit, comprising at least one of an uplink subunit or a flexible subunit.

12. The apparatus according to claim 8, wherein the second time domain unit is a time domain unit that firstly satisfies a constraint condition after the first time domain unit.

13. An information receiving apparatus, applied to a base station, wherein the apparatus comprises a processor, a memory, and a transceiver;

the transceiver is configured to:

send a first downlink channel, wherein the first downlink channel is a semi-persistent scheduling physical downlink shared channel (SPS PDSCH); and receive feedback information corresponding to the first downlink channel transmitted on a second time domain unit;

wherein the second time domain unit is a time domain unit after a first time domain unit, which is determined according to an uplink channel time domain resource, if the first time domain unit is unavailable for transmitting the feedback information corresponding to the first downlink channel, and the first time domain unit is determined according to a time domain unit occupied by the first downlink channel and time offset information;

wherein, if a first target time domain unit satisfies a constraint condition of a first uplink channel time domain resource, the first target time domain unit is determined as the second time domain unit, wherein the first target time domain unit is after the first time domain unit;

wherein the constraint condition of the first uplink channel time domain resource comprises:

in the first target time domain unit, a time domain subunit corresponding to the first uplink channel time domain resource does not comprise a downlink subunit; wherein the downlink subunit refers to a time domain subunit used for downlink transmission.

14. The apparatus according to claim 13, wherein, if a first target time domain unit does not satisfy a constraint condition of a first uplink channel time domain resource, a second target time domain unit is determined as the second time domain unit;

wherein the first target time domain unit is after the first time domain unit, the second target time domain unit is after the first target time domain unit, and the second target time domain unit satisfies a constraint condition of a second uplink channel time domain resource;

wherein the constraint condition of the second uplink channel time domain resource comprises:

in the second target time domain unit, a time domain subunit corresponding to the second uplink channel time domain resource does not comprise a downlink subunit;

wherein the downlink subunit refers to a time domain subunit used for downlink transmission.

15. The apparatus according to claim 14, wherein the second uplink channel time domain resource is determined according to second configuration information; or the second uplink channel time domain resource is determined according to a second number of bits of feedback information for the second target time domain unit.

16. The apparatus according to claim 13, wherein the first target time domain unit comprises:

a time domain unit, after the first time domain unit, comprising at least one of an uplink subunit or a flexible subunit.

17. The apparatus according to claim 13, wherein the second time domain unit is a time domain unit that firstly satisfies a constraint condition after the first time domain unit.

* * * * *